United States Patent [19]
McAndrew

[11] Patent Number: 5,271,424
[45] Date of Patent: Dec. 21, 1993

[54] DRAG REDUCTION WITH AMINE FUNCTIONAL POLYMERS

[75] Inventor: Thomas P. McAndrew, Macungie, Pa.

[73] Assignee: Air Products and Chemicals, Inc., Allentown, Pa.

[21] Appl. No.: 803,865

[22] Filed: Dec. 9, 1991

[51] Int. Cl.$^5$ .............................. F17D 1/16; F17D 1/17
[52] U.S. Cl. ....................................... 137/13; 523/175; 524/555
[58] Field of Search ..................... 523/175; 524/555; 137/13

[56] References Cited

U.S. PATENT DOCUMENTS

| | | | |
|---|---|---|---|
| 3,303,811 | 2/1967 | Giles | 114/67 |
| 3,720,216 | 3/1973 | Wartman et al. | 137/13 |
| 4,018,826 | 4/1977 | Gless, Jr. et al. | 526/310 X |
| 4,186,679 | 2/1980 | Fabula, Sr. et al. | 114/20 R |
| 4,217,214 | 8/1980 | Dubin | 210/52 |
| 4,421,602 | 12/1983 | Brunnmueller | 162/168.2 |
| 4,490,557 | 12/1984 | Dawson et al. | 564/159 |
| 4,560,710 | 12/1985 | Schulz et al. | 523/175 |
| 4,585,810 | 4/1986 | Bock et al. | 523/175 |
| 4,593,762 | 6/1986 | Interthal et al. | 523/175 X |
| 4,637,418 | 1/1987 | Karl | 137/13 |
| 4,656,204 | 4/1987 | Duvdevani et al. | 523/175 |
| 4,837,249 | 6/1989 | O'Mara et al. | 523/175 |
| 4,843,118 | 6/1984 | Lai et al. | 524/555 |
| 4,921,621 | 5/1990 | Costello et al. | 524/555 X |

FOREIGN PATENT DOCUMENTS 1605138  1/1982  United Kingdom.
2204047  4/1988  United Kingdom.

OTHER PUBLICATIONS

W. M. Kulicke, et al, "Drag Reduction Phenomenon with Special Emphasis on Homogeneous Polymer Solutions," Advances in Polymer Science, vol. 89, (1989).

*Primary Examiner*—Judy M. Reddick
*Attorney, Agent, or Firm*—Mark L. Rodgers; William F. Marsh; James C. Simmons

[57] ABSTRACT

A poly(vinylamine) which is preferably a poly(vinylamine) hydrochloride is an effective drag reducing agent in aqueous fluids under turbulent flow conditions. Apparently, because of its relatively low molecular weight, preferably in the range of about $5 \times 10^5$ to $2 \times 10^6$, this poly(vinylamine) is quite stable and maintains its drag reducing effectiveness over an extended period of usage, demonstrating superior stability to commercial polymers known as effective drag reducing agents. Effectiveness is demonstrated for both tapwater and seawater and the invention can be practiced with respect to fluids flowing through conduits or drag reduction for vessels passing through a body of water.

6 Claims, 4 Drawing Sheets

TURBULENT FLOW REDUCTION IN TAP WATER

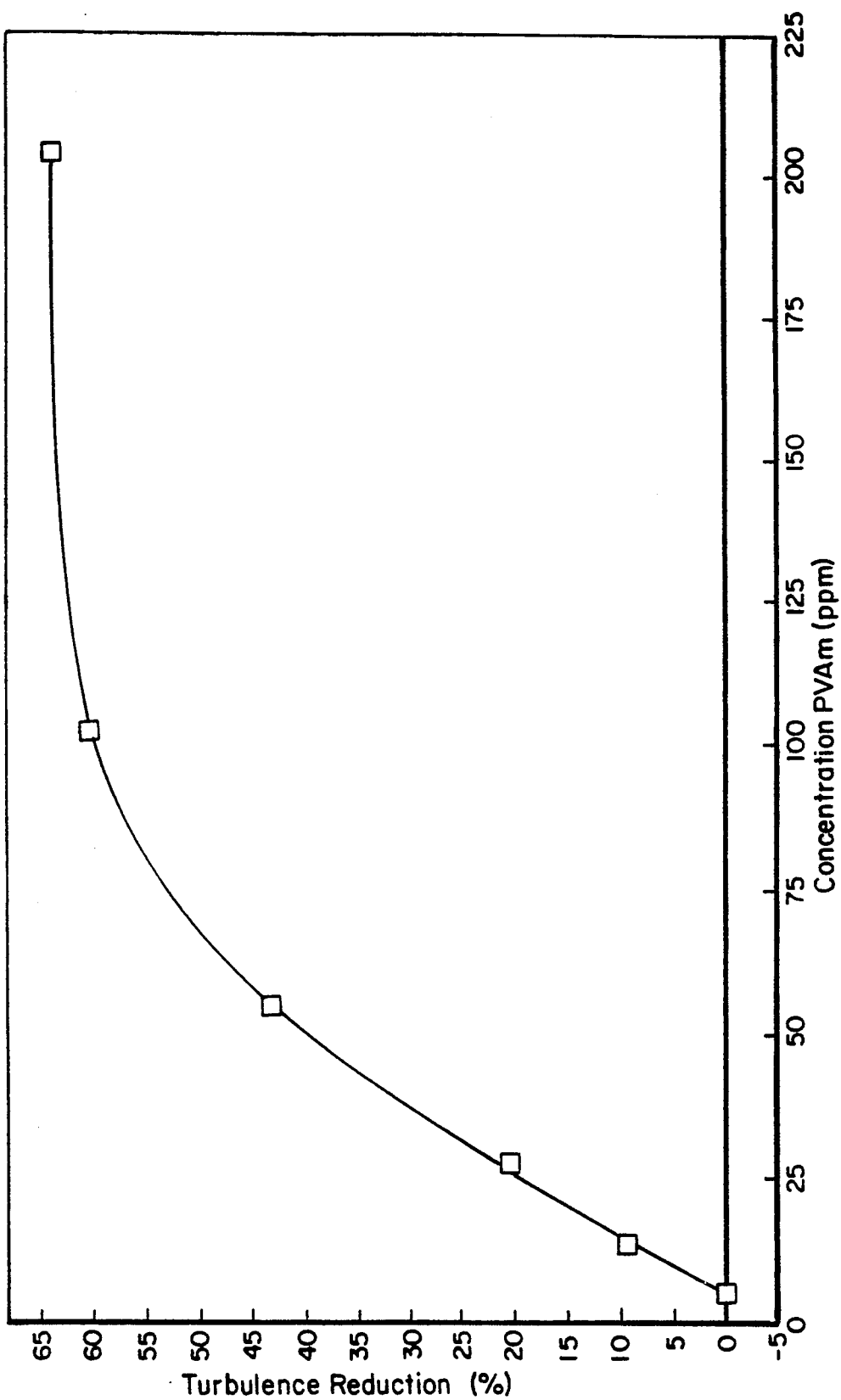

DRAG REDUCTION WITH AMINE FUNCTIONAL POLYMERS

FIELD OF THE INVENTION

This invention relates to the reduction of drag in aqueous fluids under turbulent flow. In another aspect, it relates to a method of reducing energy losses in turbulent aqueous fluid with a polymeric drag-reducing agent.

BACKGROUND OF THE INVENTION

When a fluid flows past a solid surface at high speed, turbulence develops at the interface between the fluid and the surface. Within a conduit, the fluid near the walls of the conduit moves more slowly than the fluid near the center. Crosscurrents and countercurrents develop which cause turbulence in the bulk fluid, and the net result of turbulence is a loss of energy and a consequent reduction in velocity of the moving fluid because some of the energy in the fluid velocity is converted to heat. Because of this net loss of fluid velocity, flow reduction by turbulence is often referred to as "fluid drag".

The practical significance of turbulence within a fluid flowing in a conduit can be illustrated in connection with firefighting, where turbulence severely limits equipment performance. In a pumper which has the capacity to send water, for example, 100 feet, a significant fraction of the energy originally imparted to the water is lost as heat because of turbulence. If the fluid drag caused by this turbulence could be reduced, the pumper would be able to deliver the water much further, possibly up to 150–200 ft. with the same energy input.

In 1948, the use of polymers to reduce fluid drag was discovered by B.A. Toms. It was found that the presence of very small amounts of select high molecular weight polymers could reduce turbulence and consequently fluid drag was lowered significantly. For example, the presence of about 100 ppm poly(ethyleneoxide) having a molecular weight of about $5 \times 10^6$ can reduce turbulence by as much as 50% in water flowing under conditions having a Reynolds Number of about 15,000.

Since the turbulence which is generated at the interface between a moving solid surface and fluid can also cause fluid drag, there is considerable incentive to find methods of reducing the drag which occurs as a vessel passes through a body of water. U.S. Pat. No. 3,303,811, Giles (1967), discloses a method of reducing drag for vessels traveling through water by introducing high molecular weight polymeric additives, such as poly(ethyleneoxide), polyacrylamide and polyvinylpyrrolidone. U.S. Pat. No. 3,720,216, Wartman (1973), describes reducing fluid drag in water under turbulent flow conditions by adding about 50 ppm of finely divided poly(ethyleneoxide) having a molecular weight of about $4 \times 10^6$, or generally from $10^6$ to $10^7$.

The problem of drag reduction also has military significance as shown by U.S. Pat. No. 4,186,679, Fabula, et al. (1980), which describes reducing drag on a torpedo by ejecting a water soluble polymer from ports in the nose of the torpedo as it passes through the water. The polymer which is preferred is poly(ethyleneoxide), having a molecular weight of $4 \times 10^6$ or more. Another polymer disclosed as suitable is polyacrylamide, having a molecular weight of $2 \times 10^6$. In a similar fashion, U.K. Patent 1,605,138 (1982) discloses using drag reducing agents such as poly(ethyleneoxide) and polyacrylamide to increase propulsion efficiency of a bladed propeller.

The fluid drag problem also exists in materials handling as shown by U.S. Pat. No. 4,637,418, Karl (1987), which describes using as a drag reducing agent a polymer of 2-acrylamido-2-methylpropane sulfonic acid in coal slurried in alcohol. The polymer preferably has a molecular weight above $5 \times 10^6$.

An interesting method of introducing the drag reducing agent where it is needed is described by U.K. Patent 2,204,047 (1988), which discloses releasing a drag-reducing agent from paint or a coating on a solid surface, such as the hull of a boat, thereby reducing turbulence developed at the interface of liquid flowing over the solid surface. The benefits include both increasing boat speed and decreasing the audio noise along the hull, which obviously has military significance.

A very comprehensive discussion of drag reduction is presented by Kulicke, et al., "Drag Reduction Phenomenon with Special Emphasis on Homogeneous Polymer Solutions", *Advances in Polymer Science*, Vol. 89 (1989). This article presents a general discussion of the hydrodynamics of drag reduction and the commercial potential for polymeric flow improvers. Poly(ethyleneoxide) and polyacrylamides, as well as other natural and synthetic polymers, are discussed with respect to their ability to effect drag reduction. It is concluded that polymeric additives show pronounced flow phenomena in drag reduction with increasing molecular weight of the polymer.

The necessity of having a polymer with high molecular weight introduces a problem with respect to the stability of the drag reducing agent. High molecular weight polymers tend to be broken down by the turbulence for which they are added to diminish. Consequently, such polymers tend to lose their effectiveness and need to be replaced. For example, in the trans-Alaska pipeline from Prudhoe Bay to Valdez, oil soluble polymers need to be added to the oil in the pipeline approximately every 60 miles in order to maintain reduction of turbulence and energy loss in the pipeline. It is desirable, therefore, to find polymers which are effective drag reducing agents, but remain more stable under turbulent fluid flow conditions.

U.S. Pat. No. 4,490,557, Dawson, et al. (1984), discloses poly(vinylamine) salts which can be made by acid hydrolysis of poly(N-vinylformamide). These poly(vinylamines) have molecular weights ranging from 4,000 to $8 \times 10^5$. Poly(vinylamines) of still higher molecular weight on the order of $10^6$ and greater are disclosed in U.S. Pat. No. 4,843,118, Lai, et al. (1989). These polymers are said to be useful in enhanced oil recovery. Although such polyvinylamines and their hydrochloride salts are well known, it has not heretofore been recognized that they might be useful as drag reducing agents for the various applications discussed above, where fluid drag is a serious problem.

SUMMARY OF THE INVENTION

It has been found that aqueous fluid drag, which is caused by turbulence generated by fluid flow in a conduit or fluid passing a solid surface, can be reduced by releasing into the fluid a water soluble poly(vinylamine). Preferably, this poly(vinylamine) is in the form of a hydrochloride salt. As a result, the energy required to sustain relative movement, of aqueous fluid in a conduit or motion of fluid past a solid surface can be reduced, or the velocity of the relative movement of fluid increased with the same energy input. To accomplish this, the release of poly(vinylamine).HCl is at a level of at least 10 ppm. In the case of fluid passing a solid surface, release of poly(vinylamine).HCl at the solid/liquid interface is preferred. This polymer has a molecular weight (Mw) below $7 \times 10^6$ and is less subject to degradation by polymer molecular weight reduction than are the polymers of still higher molecular weight. Preferably, the poly(vinylamine) HCl has a molecular weight (excluding the contribution of HCl) in the range of $5 \times 10^5$ to $2 \times 10^6$.

BRIEF DESCRIPTION OF THE DRAWINGS

FIG. 4 is a plot of percent turbulence reduction against concentration in parts per million (of polymer only) showing the range of concentration over which the polymer of this invention is effective in reducing drag in tap water.

DETAILED DESCRIPTION OF THE INVENTION

Figure 1:
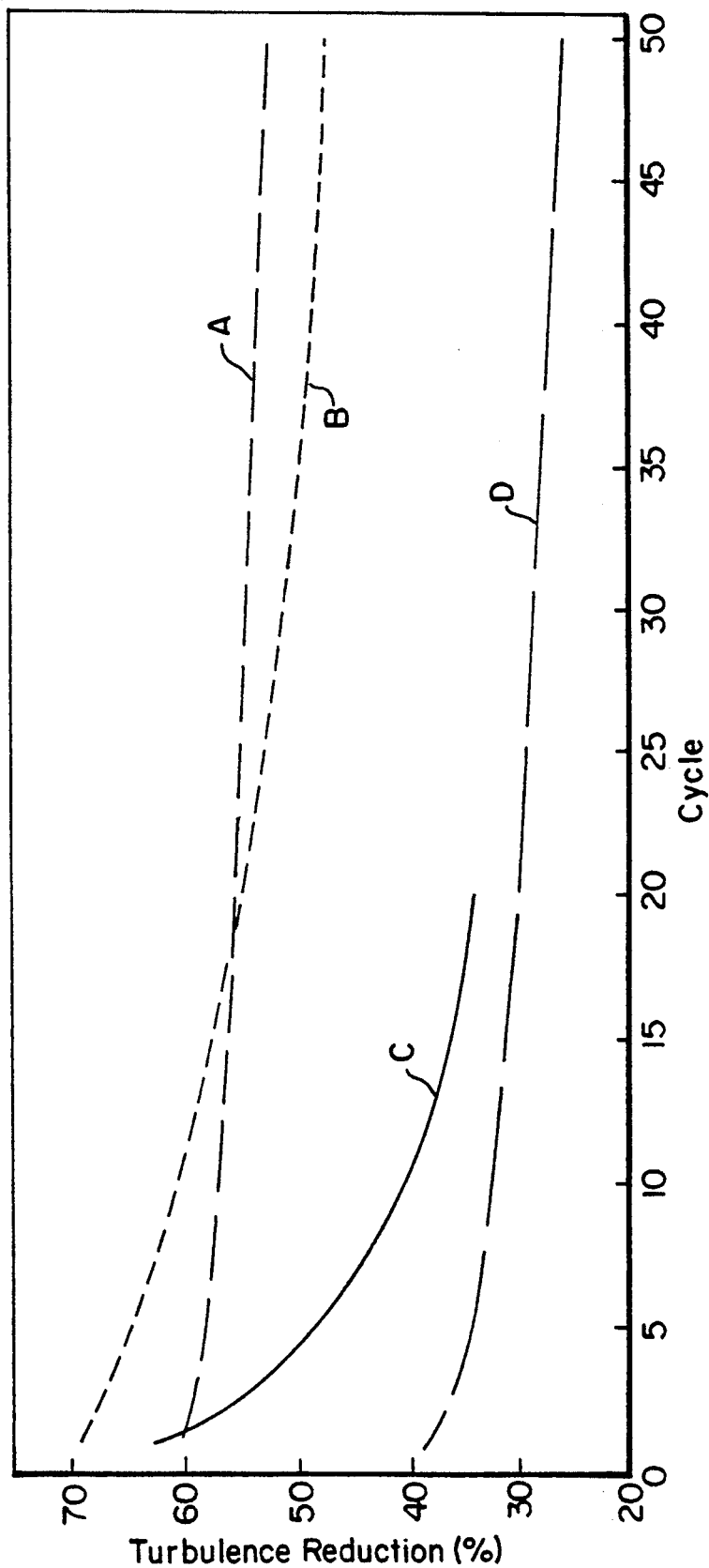
FIG. 1 is a plot comparing performance and stability of a poly(vinylamine).HCl according to this invention (curve A) with other high molecular weight polymers considered to be drag reducing agents. The percent of turbulence reduction is plotted against number of cycles over which the polymer was tested in tap water.

Fluid flows in a conduit are generally characterized by a dimensionless parameter known as the Reynolds Number (RN). Reynolds Number is defined as follows:

$$RN = \frac{[(\text{conduit diameter})(\text{fluid velocity})(\text{fluid density})]}{(\text{fluid viscosity})}$$

Reynolds Number calculations are usually performed with MKS units (where 1.0 g/cc = 1,000 kg/m$^3$ and 1.0 centipoise = 0.0010 N-s/m$^2$). Typically, conditions having Reynolds Number values over about 2,000 are considered turbulent. Thus, turbulence is fostered by high fluid velocities through wide conduits.

The flow of any fluid in a conduit at high speeds and consequently at high Reynolds Numbers will be accompanied by turbulence in that fluid. This turbulence has the practical effect of reducing fluid velocity and causing the fluid to heat. As a result, when fluid is moved through any conduit at high speed, part of the energy expended in moving the fluid is consumed in overcoming the drag caused by the turbulence. This is quite inefficient use of energy.

It has been found that poly(vinylamine).HCl exhibits excellent performance as a turbulence (drag) reducing agent when dissolved in water flowing at a high Reynolds Number. The level of drag reduction imparted by poly(vinylamine). HCl in ordinary tap water or in sea water is comparable to established materials at comparable concentrations. Such commercial materials well known as drag reducing agents are polyacrylamide with a molecular weight of about $4.5 \times 10^6$ and poly(ethyleneoxide) having a molecular weight of about $5 \times 10^6$. The behavior of poly(vinylamine).HCl in this service is comparable to these polymers even though it has a much lower molecular weight. Even more notable, however, is that the poly(vinylamine).HCl is much more stable within the aqueous fluid on continuous use, even at a high Reynolds Number, for example, about 17,000. Because of this higher stability, less fresh polymer has to be added to the system in order to replenish the polymer which has degraded.

The invention can be practiced simply by dissolving poly(vinylamine).HCl into the aqueous fluid, usually water, at concentrations of at least 10 ppm and normally in the range of about 50 to 200 ppm, considering in this measurement only the weight of the poly(vinylamine) in the poly(vinylamine).HCl salt.

Drag reduction is dependent upon the molecular weight of the polymer added. Prior to the present invention, if the molecular weight were below about $1-2 \times 10^6$, good drag reduction would not be expected for polymer solutions at levels of about 100 ppm. Although not to be bound by theory, it is believed that the poly(vinylamine).HCl used according to this invention works very effectively, even though it has a relatively low molecular weight because it has a high hydrodynamic volume, with an intrinsic viscosity of about 5.5 in a polymer which has a weight average molecular weight as determined by gel permeation chromatography (GPC) of about $8 \times 10^5$. This contrasts to such polymers as polyacrylamide which, with a molecular weight of $4.5 \times 10^6$, has an intrinsic viscosity of about 6. Therefore, in solution, poly(vinylamine).HCl has a relatively large volume and this may account for its effectiveness as a drag-reducing agent, which is considerably higher than would be expected from its molecular weight. Nevertheless, it is thought that because of its lower molecular weight and resulting shorter chain length for the polymer molecule, the poly(vinylamine).HCl exhibits stability under turbulent flow conditions of the fluid to which it is added. Because of the shorter chain length there is less chance for chain entanglement to occur. Under shear, such entanglements lead to rupture in the chain of the polymer molecule. Whatever the explanation, it is clear from experience in measuring reduction in turbulence with poly(vinylamine).HCl, that the polymer does not degrade under shear to the same extent as polymers of higher molecular weight, such as the effective commercial polymers of poly(ethyleneoxide) and polyacrylamide.

The poly(vinylamine).HCl used in this invention can be obtained as described in the U.S. Pat. No. 4,490,557 to Dawson, et al. Higher molecular weight polymers can be obtained using inverse emulsion polymerization as described in U.S. Pat. No. 4,843,118 of Lai et al. The poly(vinylamines) are formed by hydrolysis, preferably acid hydrolysis, of poly(vinylamides) such as poly(N-vinylformamide) or poly(N-vinylacetamide). It is desirable that the hydrolysis of the poly(vinylamide) be essentially complete, which under normal conditions is about 90 to 95% complete. In other words, at least about 90% of the amide group should be hydrolyzed to amine functionality. Although the poly(vinylamine) can be used in its free base or neutralized form, it is preferred to practice the invention with the polymer in the hydrochloride salt form as it is obtained on acid hydrolysis with hydrochloric acid of the poly(vinylamide). In practice, the amine functional polymer may contain other copolymerizable units or modifications as long as the resultant polymer is substantially vinylamine units and meets the Mw requirements set forth below.

The molecular weight of the polymer is a weight average molecular weight determined by GPC and as referred to herein is the molecular weight of only the polymer portion of the molecule, so that the molecular weights given apply essentially equally to the unprotonized form of the polymer and to the hydrochloride salt. Preferably the molecular weight is less than $7 \times 10^6$ and most desirably is in the range of $5 \times 10^5$ to $2 \times 10^6$ as determined on a salt-free basis.

The amount of polymer released into the fluid which is to come under turbulent flow conditions, is that sufficient to produce a drag reducing effect and is generally at least 10 ppm based upon the weight of the salt-free polymer. Preferably, the amount of polymer is in the range of 50 to 250 ppm, and more desirably is about 75 to 125 ppm, on a salt-free basis.

When referring to "turbulent flow conditions" in this description, it is intended to define the conditions in the fluid which would exist were it not for the addition of the drag reducing agent. In almost all situations, the gross character of the fluid, such as that flowing through a conduit, will remain in a turbulent condition as measured by Reynolds Number, but the total amount of turbulence which exists in the flowing aqueous fluid is substantially reduced. This, of course, explains why there is a reduction in drag, as well as a reduction in the buildup of heat in the fluid and the consequent loss of energy. A comparable phenomenon occurs in the case of a vessel moving through a body of water.

Considerable effort has been devoted to reducing drag on the surface of vessels, such as ships, boats, torpedoes, and the like, which pass through the water at sufficiently high speeds to create a zone of turbulence around the interface between the water and the outer hull of the vessel. Applications of drag reduction which can be enjoyed according to this invention are illustrated by the references cited in the Background. Other applications where the invention can be practiced involve situations such as cement pumping, enhancing the flow of water in municipal sewers and drains, in water supply conduits, in water drilling equipment, and even in promoting blood flow in persons with cardiovascular disease. It has been demonstrated that the addition of a drag reducing polymer solution to the water immediately in front of the bow of a vessel, greatly reduces drag. While this may be critical in the area of shipping, it is of even greater importance in military systems such as submarines and torpedoes.

In order to illustrate this invention further, the following examples are presented. These are specific embodiments of the invention which should not be construed to limit the invention unduly.

EXAMPLE I

The turbulence reducing effect and stability over a number of cycles were examined for a poly(vinylamine) hydrochloride having a molecular weight of $8 \times 10^5$ and an intrinsic viscosity of 5.5. This is a weight average molecular weight which refers only to the polymer chain without the HCl. The polymer was prepared by the acid hydrolysis of poly(N-vinylformamide) having a molecular weight of about $2.4 \times 10^6$. The performance of this polymer was compared with a poly(acrylamide) having a molecular weight of about $4.5 \times 10^6$ and an intrinsic viscosity of 6. This polymer was obtained from Aldrich Chemical. Also compared was a poly(ethyleneoxide) having a molecular weight of about $5 \times 10^6$. Such a polymer is available from either Union Carbide or Aldrich Chemical. Also tested in this environment was a polymer which is a poly(trimethylammoniumethylmethacrylate) (PTAEM) having an intrinsic viscosity of 10. Each of these four polymers was dissolved in tapwater at a level of about 100 ppm. For the poly(vinylamine) hydrochloride, the total material was dissolved in tapwater to a level of 190 ppm, which provides a level of 103 ppm of the poly(vinylamine) in solution. All four polymer solutions were made by allowing the polymer to dissolve quiescently in water for at least 48 hours. This was done to eliminate any possibility of polymer degradation during dissolution.

The amount of turbulence in a given fluid was measured using a turbulent flow rheometer in the following manner:

The fluid was passed through a thin (about 2 mm) stainless steel tubing at a high rate of speed (5-9 meters/second). This was at a high Reynolds Number (about 17,000 at about 9 meters/second), therefore, a turbulent situation existed.

Using a Validyne PS-309 pressure transducer, a direct pressure drop was measured at two fixed points (about 12 cm apart) along the thin stainless steel tubing. By comparing the pressure drop of a given polymer solution to that observed for untreated water, the amount of drag reduction (DR) was calculated using the following equation:

$$DR\ (\%) = \left[ 1 - \frac{P \text{ drop (polymer solution)}}{P \text{ drop (untreated water)}} \right] \times 100$$

All comparisons were made at a constant Reynolds Number.

The rheometer, which used an Isco syringe pump driven by a secondary motor, allowed about 380 ml of a given solution to be cycled as many times as desired. The pressure drops were measured during a forward cycle while the solution was collected in a reservoir. The solution was then drawn back in a reverse cycle via separate tubing. After each reverse cycle, a forward cycle was run and another pressure drop measured. In this way stability of the polymer was determined over a number (50-60) of cycles.

The results of these runs are plotted and shown in FIG. 1, in which curve A is a plot of the performance in turbulence reduction over 50 cycles for the poly(vinylamine) hydrochloride. Curve B is a plot of the performance for PTAEM, curve C is a plot of the performance for the poly(ethyleneoxide) and curve D is a plot of the performance for the polyacrylamide. The superior stability for the poly(vinylamine).HCl is clearly shown in FIG. 1. The Reynolds number in this series of runs was 17,100. Drag reduction for the poly(vinylamine).HCl was about 60% initially, and did not diminish significantly even after 50 cycles, whereas the other three polymers showed a significant reduction in effectiveness over the same test period.

EXAMPLE II

Figure 2:
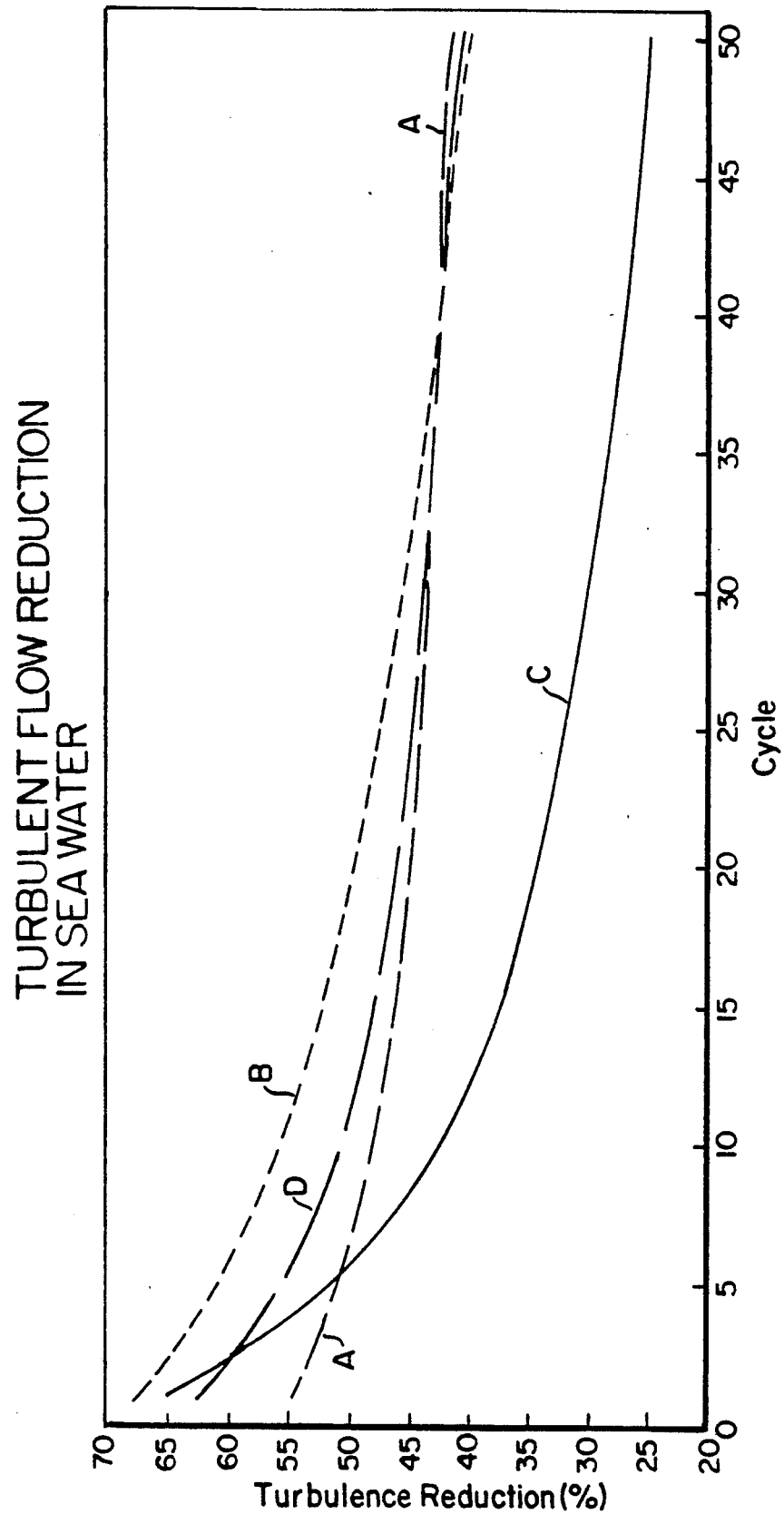
FIG. 2 is a plot of percent turbulence reduction against test cycles for the same polymers as shown in FIG. 1, except using laboratory prepared sea water as the fluid.

Turbulence reduction runs were made with the same four polymers as in Example I, except using simulated seawater, which was laboratory prepared by adding 3 wt. % of aquarium salt to tapwater. The aquarium salt was about 99% sodium chloride. Otherwise, the conditions of these runs were the same as described in connection with Example I and the results of turbulent flow reduction in seawater are shown in FIG. 2, curves A, B, C and D referring to the same polymers as described in Example I. The same trends are apparent although the performance of the poly(vinylamine).HCl was somewhat less effective. The stability of the polymer, however, was superior to the others and after 50 cycles it was the best of the four polymers in performance.

EXAMPLE III

Figure 3:
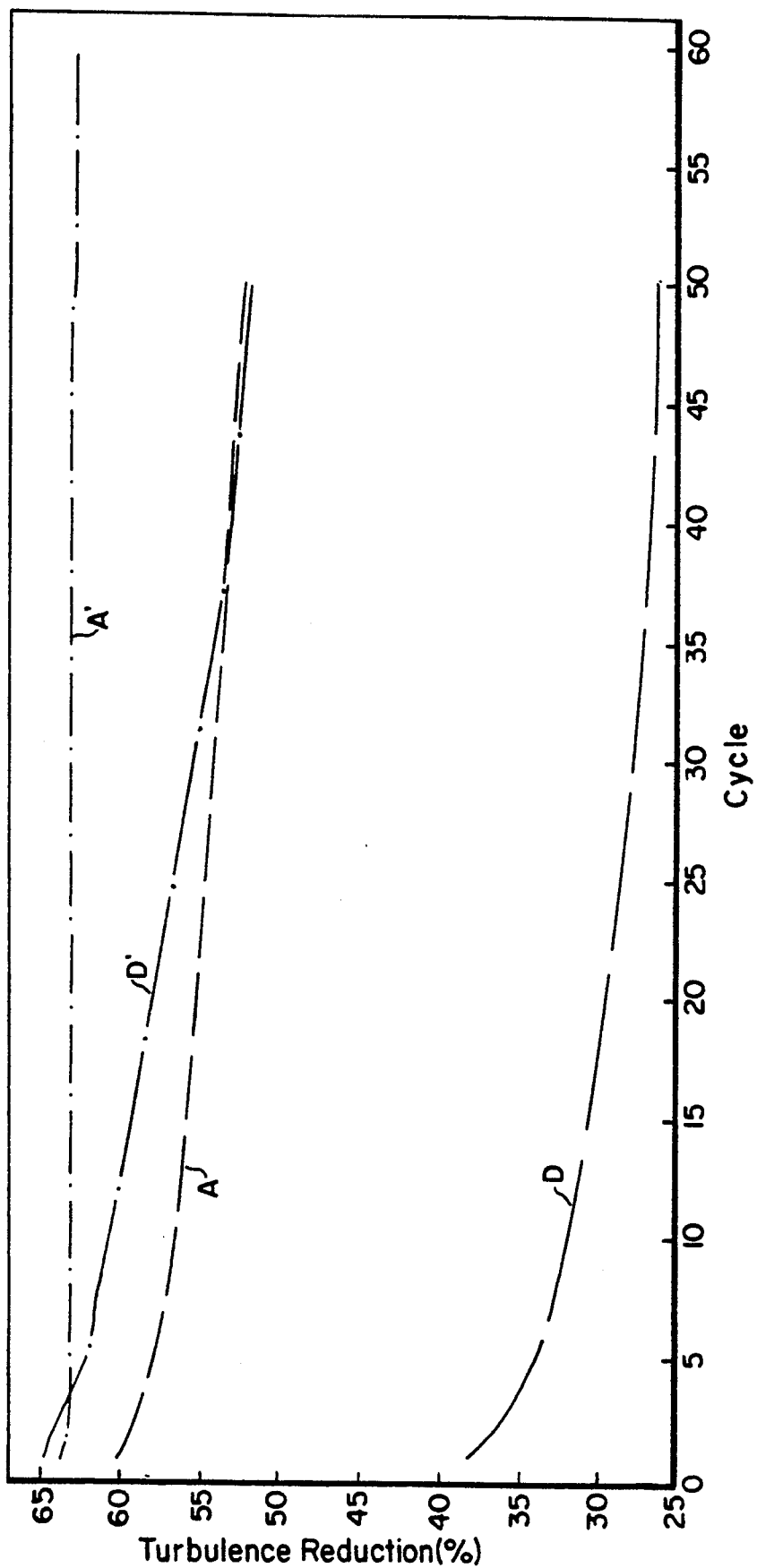
FIG. 3 is a similar plot of percent turbulence reduction against test cycles showing the performance and stability of the polymer used for this invention at two concentration levels compared with a commercial polymer at the same relative concentrations.

Turbulence reduction runs over 50 to 60 cycles were made for poly(vinylamine).HCl and polyacrylamide at two polymer levels, 103 ppm and 205 ppm. The polyacrylamide and the poly(vinylamine).HCl were the same polymers as described in Example I. Performance of the poly(vinylamine).HCl at 103 ppm is shown by curve A and at 205 ppm by curve A'. The plot for the performance of the polyacrylamide at 103 ppm is shown by curve D and at 205 ppm by curve D'. The excellent stability of the poly(vinylamine).HCl is again demonstrated by the data plotted in FIG. 3. At 205 ppm there was essentially no decrease in turbulence reduction effectiveness for the poly(vinylamine).HCl, and at 103 ppm after 50 cycles, the poly(vinylamine).HCl was more effective than the polyacrylamide at twice the polymer level.

EXAMPLE IV

Drag reduction for the poly(vinylamine).HCl as described in Example I was measured over several concentration levels of the polymer in tapwater. At a level of about 5 ppm the drag reduction varied continuously during the run from 8% to −44%, so that this level was assigned a value of 0% turbulence reduction. From this baseline the turbulence reduction of the other levels of polymer were plotted and are shown in the graph of FIG. 4. All of the data are from the first cycles of the runs made as described in Example 1. It can be seen from these data as shown in FIG. 4 that, although higher levels of polymer can be used with slight advantage, most of the benefit of the turbulence reduction effect of the polymer has been realized by the time the polymer level reaches about 100 ppm. These polymer levels are, as in Example I-III, based upon the poly(vinylamine) portion of the poly(vinylamine).HCl.

Further advantages and embodiments of our invention will be apparent to those skilled in the art from the foregoing discussion without departing from the spirit or scope of the invention.

I claim:

1. A method of reducing drag between a solid surface and aqueous fluid passing said surface under turbulent flow conditions which comprises releasing into said fluid a water soluble poly(vinylamine) in an amount in the range of 50 to 250 ppm based upon the weight of the salt-free polymer.

2. The method of claim 1 wherein said poly(vinylamine) is in the form of a hydrochloride salt.

3. The method of claim 2 wherein said poly(vinylamine) has a weight average molecular weight in the range of $5 \times 10^5$ to $2 \times 10^6$ on a salt-free basis.

4. The method of claim 1 wherein said aqueous fluid is water.

5. The method of claim 4 wherein said water is seawater which contains about 3% by weight sodium chloride.

6. The method of claim 1 wherein said aqueous fluid is flowing in a conduit under turbulent flow conditions.

* * * * *